(12) United States Patent   (10) Patent No.: US 12,612,488 B2

Matsuoka   (45) Date of Patent: Apr. 28, 2026

(54) RESIN COMPOSITION FOR INJECTION MOLDING AND INJECTION-MOLDED ARTICLE

(71) Applicant: KANEKA CORPORATION, Osaka (JP)

(72) Inventor: Yoshiaki Matsuoka, Settsu (JP)

(73) Assignee: KANEKA CORPORATION, Osaka (JP)

( * ) Notice: Subject to any disclaimer, the term of this patent is extended or adjusted under 35 U.S.C. 154(b) by 516 days.

(21) Appl. No.: 18/246,269

(22) PCT Filed: Sep. 16, 2021

(86) PCT No.: PCT/JP2021/034056
§ 371 (c)(1),
(2) Date: Mar. 22, 2023

(87) PCT Pub. No.: WO2022/065181
PCT Pub. Date: Mar. 31, 2022

(65) Prior Publication Data

US 2023/0357492 A1      Nov. 9, 2023

(30) Foreign Application Priority Data

Sep. 24, 2020    (JP) ................................. 2020-159748

(51) Int. Cl.
| | |
|---|---|
| *C08G 63/06* | (2006.01) |
| *B29C 45/00* | (2006.01) |
| *C08K 3/34* | (2006.01) |
| *B29K 67/00* | (2006.01) |

(52) U.S. Cl.
CPC .......... *C08G 63/06* (2013.01); *B29C 45/0001* (2013.01); *C08K 3/34* (2013.01); *B29K 2067/04* (2013.01)

(58) Field of Classification Search
None
See application file for complete search history.

(56) References Cited

U.S. PATENT DOCUMENTS

| | | | |
|---|---|---|---|
| 2016/0215138 A1* | 7/2016 | Suzuki | ................... C08L 33/06 |
| 2016/0251494 A1 | 9/2016 | Koyama et al. | |
| 2017/0362396 A1* | 12/2017 | Minami | ................. C08L 67/04 |
| 2019/0003082 A1 | 1/2019 | Kikutani et al. | |

FOREIGN PATENT DOCUMENTS

| | | |
|---|---|---|
| JP | 2008-189861 A | 8/2008 |
| JP | 2008-303286 A | 12/2008 |
| JP | 2014-227543 A | 12/2014 |
| WO | WO 2015/052876 A1 | 4/2015 |
| WO | WO 2017/122679 A1 | 7/2017 |

OTHER PUBLICATIONS

International Search Report with English translation mailed on Dec. 7, 2021 in PCT/JP2021/034056 filed on Sep. 16, 2021 (4 pages).

* cited by examiner

*Primary Examiner* — Robert S Jones, Jr.
*Assistant Examiner* — Lily K Sloan
(74) *Attorney, Agent, or Firm* — Oblon, McClelland, Maier & Neustadt, L.L.P.

(57)          ABSTRACT

A resin composition for injection molding contains a poly (3-hydroxyalkanoate) resin. The poly(3-hydroxyalkanoate) resin includes at least one copolymer of 3-hydroxybutyrate units and other hydroxyalkanoate units. The average content of the 3-hydroxybutyrate units in the poly(3-hydroxyalkanoate) resin is from 92 to 99 mol %. The polystyrene-equivalent weight-average molecular weight of the poly(3-hydroxyalkanoate) resin, as measured by gel permeation chromatography using a chloroform solvent, is from $21 \times 10^4$ to $38 \times 10^4$. In a weight molecular weight distribution of the poly(3-hydroxyalkanoate) resin, the proportion of a component having a weight molecular weight of $20 \times 10^4$ or less is from 35 to 60 wt %.

20 Claims, 1 Drawing Sheet

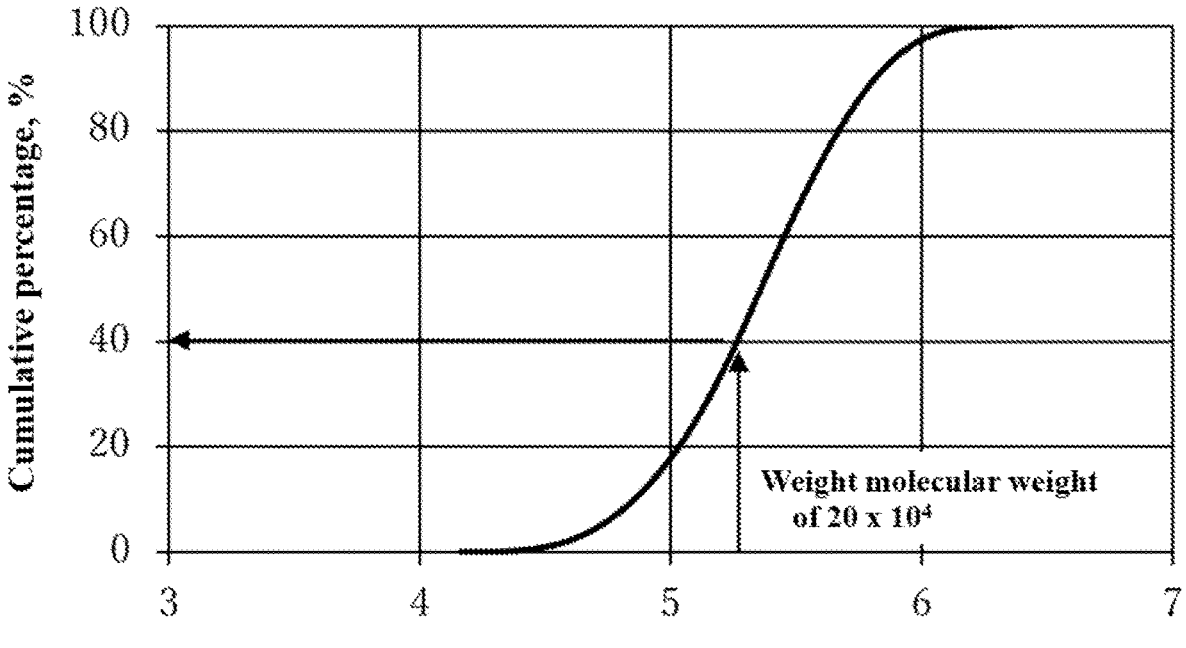

RESIN COMPOSITION FOR INJECTION MOLDING AND INJECTION-MOLDED ARTICLE

CROSS-REFERENCE TO RELATED APPLICATIONS

The present application is a 35 U.S.C. § 371 national stage patent application of International patent application PCT/JP2021/034056 filed on Sep. 16, 2021, which is based on and claims the benefits of priority to Japanese Application No. 2020-159748, filed on Sep. 24, 2020. The entire contents of all of the above applications are incorporated herein by reference.

TECHNICAL FIELD

The present invention relates to a resin composition for injection molding that contains a poly(3-hydroxyalkanoate) resin and to an injection-molded article.

BACKGROUND ART

In recent years, environmental problems caused by waste plastics have become an issue of great concern. In particular, it has been found that a huge amount of plastics dumped at seas or carried into seas through rivers are drifting in the ocean on a global scale. Such plastics, which retain their shapes for a long period of time, are pointed out as having various harmful effects on the ecosystems, and examples of plastics-induced problems include: a phenomenon called ghost fishing where plastics catch or trap marine creatures; and eating disorder from which marine creatures having ingested plastics suffer due to the plastics remaining in their digestive organs.

There is also known a problematic phenomenon where plastics are broken into microplastic particles by the action of ultraviolet rays or any other cause, then the microplastic particles adsorb hazardous compounds present in the ocean, and marine creatures ingest the microplastic particles with the adsorbed compounds, so that hazardous substances are introduced into the food chain.

The use of biodegradable plastics is expected as means for addressing the plastics-induced marine pollution as described above. However, a report issued by the United Nations Environment Programme in 2015 states that plastics such as polylactic acid that can be biodegraded through composting are not expected to be degraded quickly in the actual ocean whose temperature is low and cannot therefore be used as a countermeasure against the marine pollution.

Under these circumstances, poly(3-hydroxyalkanoate) resins, which can be biodegraded even in seawater, are attracting attention as materials that can be a solution to the above problems. However, poly(3-hydroxyalkanoate) resins solidify slowly, and for this reason injection molding of a poly(3-hydroxyalkanoate) resin is likely to suffer from burr formation.

Patent Literature 1 discloses a resin composition containing a poly(3-hydroxyalkanoate) resin such as poly(3-hydroxybutyrate-co-3-hydroxyhexanoate), pentaerythritol, and a filler. Patent Literature 1 states that the use of pentaerythritol and a filler improves the solidification performance of the poly(3-hydroxyalkanoate) resin and reduces burr formation in injection molding.

Patent Literature 2 discloses a resin composition containing a polyhydroxyalkanoate such as poly(3-hydroxybutyrate-co-3-hydroxyhexanoate) and a low-melting polyhydroxybutyrate having a weight-average molecular weight of 5,000 to 50,000 and a melting point of 140 to 170° C. Patent Literature 2 states that the use of the low-melting polyhydroxybutyrate increases the crystallization speed of the polyhydroxyalkanoate. Patent Literature 2 is silent about burr formation in injection molding.

CITATION LIST

Patent Literature

PTL 1: WO 2015/052876
PTL 2: Japanese Laid-Open Patent Application Publication No. 2014-227543

SUMMARY OF INVENTION

Technical Problem

With the technique disclosed in Patent Literature 1 or 2, burr formation in injection molding could not be adequately reduced although the solidification performance of the poly(3-hydroxyalkanoate) resin may be improved. Additionally, the resulting injection-molded article tends to undergo deterioration in mechanical properties upon exposure to high temperature and could be unsuitable for use at high temperature.

"Burr" refers to a defect formed owing to entry of a molten resin into a gap located at a junction (such as a parting line portion, an insert portion, or a slide core sliding portion) between cavity halves of a mold for injection molding. On the surface of the injection-molded article produced, the burr lies along the region corresponding to the location of the junction and could impair the appearance quality of the injection-molded article.

In view of the above circumstances, the present invention aims to provide a resin composition containing a poly(3-hydroxyalkanoate) resin and formable into an injection-molded article having little burr and suitable for use at high temperature.

Solution to Problem

As a result of intensive studies with the goal of solving the above problem, the present inventors have found that an injection-molded article having little burr and suitable for use at high temperature can be formed when the monomer composition of a poly(3-hydroxyalkanoate) resin, the average molecular weight of the poly(3-hydroxyalkanoate) resin, and the proportion of a low-molecular weight component in the poly(3-hydroxyalkanoate) resin are controlled in given ranges. Based on this finding, the inventors have completed the present invention.

Specifically, the present invention relates to a resin composition for injection molding, the resin composition containing a poly(3-hydroxyalkanoate) resin, wherein the poly(3-hydroxyalkanoate) resin includes at least one copolymer of 3-hydroxybutyrate units and other hydroxyalkanoate units, an average content of the 3-hydroxybutyrate units in the poly(3-hydroxyalkanoate) resin is from 92 to 99 mol %, a polystyrene-equivalent weight-average molecular weight of the poly(3-hydroxyalkanoate) resin, as measured by gel permeation chromatography using a chloroform solvent, is from $21 \times 10^4$ to $38 \times 10^4$, and in a weight molecular weight distribution of the poly(3-hydroxyalkanoate) resin, a proportion of a component having a weight molecular weight of $20 \times 10^4$ or less is from 35 to 60 wt %.

Preferably, the poly(3-hydroxyalkanoate) resin includes at least one selected from the group consisting of poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate).

Preferably, the poly(3-hydroxyalkanoate) resin is poly(3-hydroxybutyrate-co-3-hydroxyhexanoate).

Preferably, an amount of a resin other than the poly(3-hydroxyalkanoate) resin is from 0 to 35 parts by weight per 100 parts by weight of the poly(3-hydroxyalkanoate) resin.

Preferably, the resin composition for injection molding further contains a nucleating agent and/or a lubricant.

Preferably, the resin composition for injection molding further contains 1 to 50 parts by weight of an inorganic filler per 100 parts by weight of a total resin component including the poly(3-hydroxyalkanoate) resin.

Preferably, the inorganic filler is a silicate. More preferably, the silicate includes at least one selected from the group consisting of talc, mica, kaolinite, montmorillonite, and smectite.

The present invention further relates to an injection-molded article including the resin composition for injection molding.

Advantageous Effects of Invention

The present invention can provide a resin composition containing a poly(3-hydroxyalkanoate) resin and formable into an injection-molded article having little burr and suitable for use at high temperature. The resin composition or injection-molded article according to a preferred embodiment of the present invention has the potential advantage of solving environmental problems caused by sea dumping of plastics since the main material of the resin component is a poly(3-hydroxyalkanoate) resin degradable in seawater.

BRIEF DESCRIPTION OF DRAWINGS

FIGURE shows an example of a cumulative weight molecular weight distribution used to calculate the amount of a low-molecular-weight component having a weight molecular weight of $20 \times 10^4$ or less.

DESCRIPTION OF EMBODIMENTS

Hereinafter, an embodiment of the present invention will be described. The present invention is not limited to the embodiment described below.

A resin composition according to the present embodiment is one used in injection molding to produce a molded article. The resin composition contains at least a poly(3-hydroxyalkanoate) resin as a resin component.

Poly(3-hydroxyalkanoate) Resin

The poly(3-hydroxyalkanoate) resin (abbreviated as P3HA), which is a main resin component of the resin composition for injection molding, is a polymer containing 3-hydroxyalkanoate structural units (monomer units). One poly(3-hydroxyalkanoate) resin may be used alone, or two or more poly(3-hydroxyalkanoate) resins may be used in combination.

To be specific, the 3-hydroxyalkanoate structural units are preferably structural units represented by the following formula (1).

$$[-CHR-CH_2-CO-O-] \tag{1}$$

In the formula (1), R is an alkyl group represented by $C_pH_{2p+1}$, and p is an integer from 1 to 15. Examples of the R group include linear or branched alkyl groups such as methyl, ethyl, propyl, methylpropyl, butyl, isobutyl, t-butyl, pentyl, and hexyl groups. The integer p is preferably from 1 to 10 and more preferably from 1 to 8.

The poly(3-hydroxyalkanoate) resin is particularly preferably a microbially produced poly(3-hydroxyalkanoate) resin. In the microbially produced poly(3-hydroxyalkanoate) resin, all of the 3-hydroxyalkanoate structural units are contained as (R)-3-hydroxyalkanoate structural units.

The poly(3-hydroxyalkanoate) resin preferably contains 50 mol % or more of 3-hydroxyalkanoate structural units (in particular, the structural units represented by the formula (1)) in the total structural units, and the content of the 3-hydroxyalkanoate structural units is more preferably 60 mol % or more and even more preferably 70 mol % or more. The poly(3-hydroxyalkanoate) resin may contain only one type or two or more types of 3-hydroxyalkanoate structural units as polymer repeating units or may contain other structural units (such as 4-hydroxyalkanoate structural units) in addition to the one type or two or more types of 3-hydroxyalkanoate structural units.

Specific examples of the poly(3-hydroxyalkanoate) resin include poly(3-hydroxybutyrate), poly(3-hydroxybutyrate-co-3-hydroxypropionate), poly(3-hydroxybutyrate-co-3-hydroxyvalerate) abbreviated as "P3HB3HV", poly(3-hydroxybutyrate-co-3-hydroxyvalerate-3-hydroxyhexanoate), poly(3-hydroxybutyrate-co-3-hydroxyhexanoate) abbreviated as "P3HB3HH", poly(3-hydroxybutyrate-co-3-hydroxyheptanoate), poly(3-hydroxybutyrate-co-3-hydroxyoctanoate), poly(3-hydroxybutyrate-co-3-hydroxynonanoate), poly(3-hydroxybutyrate-co-3-hydroxydecanoate), poly(3-hydroxybutyrate-co-3-hydroxyundecanoate), and poly(3-hydroxybutyrate-co-4-hydroxybutyrate) abbreviated as "P3HB4HB".

In the present embodiment, the poly(3-hydroxyalkanoate) resin includes at least one copolymer of 3-hydroxybutyrate (hereinafter also referred to as "3HB") units and other hydroxyalkanoate units. The poly(3-hydroxyalkanoate) resin may include only one such copolymer or two or more such copolymers. The poly(3-hydroxyalkanoate) resin may consist only of the at least one copolymer or may include poly(3-hydroxybutyrate), i.e., a homopolymer of 3-hydroxybutyrate, in addition to the at least one copolymer.

In particular, in terms of factors such as processability and mechanical properties, the copolymer of 3-hydroxybutyrate units and other hydroxyalkanoate units is preferably at least one selected from the group consisting of poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate), more preferably poly(3-hydroxybutyrate-co-3-hydroxyhexanoate) and/or poly(3-hydroxybutyrate-co-4-hydroxybutyrate), and even more preferably poly(3-hydroxybutyrate-co-3-hydroxyhexanoate).

The average content ratio between 3-hydroxybutyrate units and other hydroxyalkanoate units (3-hydroxybutyrate units/other hydroxyalkanoate units) in the total poly(3-hydroxyalkanoate) resin contained in the resin composition for injection molding is from 92/8 to 99/1 (mol %/mol %). If the average content of the 3-hydroxybutyrate units is less than 92 mol %, the crystallization speed of the resin is so low that the molten resin is likely to enter a gap located at a junction between the cavity halves of the mold and that therefore the injection-molded article is likely to suffer from burr formation. If the average content of the 3-hydroxybutyrate units is more than 99 mol %, the mechanical properties of the injection-molded article tend to deteriorate. The average content ratio is preferably from 93/7 to 98/2 (mol %/mol %) and more preferably from 94/6 to 97/3 (mol %/mol %).

The respective average contents of different monomer units in the total poly(3-hydroxyalkanoate) resin can be determined by a method known to those skilled in the art, such as by a method described in paragraph [0047] of WO 2013/147139. The "average content" of certain monomer units refers to their proportion in all monomer units of the total poly(3-hydroxyalkanoate) resin contained in the resin composition for injection molding. When the poly(3-hydroxyalkanoate) resin is a mixture of two or more poly(3-hydroxyalkanoate) resins, the average content of certain monomer units refers to their proportion in the total mixture.

In the present embodiment, the weight-average molecular weight of the poly(3-hydroxyalkanoate) resin is controlled in the range of $21\times10^4$ to $38\times10^4$ in order to both reduce burr formation in the injection-molded article and ensure the suitability of the injection-molded article for use at high temperature. If the weight-average molecular weight is more than $38\times10^4$, the injection pressure is so high that the injection-molded article produced is likely to suffer from burr formation. When the weight-average molecular weight of the poly(3-hydroxyalkanoate) resin is $38\times10^4$ or less, the melt viscosity of the molten resin decreases, and thus the injection pressure required in injection molding can be lowered. This is expected to result in reduced entry of the molten resin into a gap of the mold and therefore reduced burr formation. If the weight-average molecular weight is less than $21\times10^4$, the mechanical strength of the injection-molded article tends to decrease at high temperature. Additionally, the melt viscosity of the resin is so low that the molten resin is likely to enter a gap of the mold, thus increasing the likelihood of burr formation. The weight-average molecular weight is preferably from $22\times10^4$ to $35\times10^4$, more preferably from $22\times10^4$ to $30\times10^4$, and even more preferably from $22\times10^4$ to $27\times10^4$. In order to further reduce burr formation, the weight-average molecular weight is particularly preferably $24\times10^4$ or less.

When the poly(3-hydroxyalkanoate) resin is a mixture of two or more poly(3-hydroxyalkanoate) resins, the weight-average molecular weight measured for the total mixture of the poly(3-hydroxyalkanoate) resins falls within the range mentioned above. In this case, the weight-average molecular weight of each poly(3-hydroxyalkanoate) resin is not limited to a particular range.

The weight-average molecular weight of the poly(3-hydroxyalkanoate) resin can be measured as a polystyrene-equivalent molecular weight by gel permeation chromatography using a chloroform solvent. The column used in the gel permeation chromatography may be any column suitable for weight-average molecular weight measurement.

According to the present embodiment, in the poly(3-hydroxyalkanoate) resin, the amount of a low-molecular-weight component having a weight molecular weight of $20\times10^4$ or less in a weight molecular weight distribution is controlled in the range of 35 to 60 wt % in order to both reduce burr formation in the injection-molded article and ensure the suitability of the injection-molded article for use at high temperature. If the amount of the low-molecular-weight component is less than 35 wt %, the injection-molded article produced is likely to suffer from burr formation. If the amount of the low-molecular-weight component is more than 60 wt %, the mechanical strength of the injection-molded article tends to decrease at high temperature. Additionally, the injection-molded article is likely to suffer from burr formation, or the low-molecular-weight component is likely to leak out of the injection-molded article in situations such as during the use of the injection-molded article at high temperature. The amount of the low-molecular-weight component is preferably from 35 to 55 wt % and more preferably from 37 to 52 wt %.

When the poly(3-hydroxyalkanoate) resin is a mixture of two or more poly(3-hydroxyalkanoate) resins, the amount of the low-molecular-weight component in a weight molecular weight distribution measured for the total mixture of the poly(3-hydroxyalkanoate) resins falls within the range mentioned above. In this case, the amount of the low-molecular-weight component in each poly(3-hydroxyalkanoate) resin is not limited to a particular range.

The amount of the low-molecular-weight component can be determined as follows: the weight molecular weight distribution obtained through the above-mentioned weight-average molecular weight measurement is converted into a cumulative weight molecular weight distribution as shown in FIGURE; and the proportion of the low-molecular-weight component having a weight molecular weight of $20\times10^4$ or less in the total resin amount is calculated from the cumulative distribution. To eliminate the influence of other components such as additives, the weight molecular weight region up to 1000 is excluded from the calculation.

The method for producing the poly(3-hydroxyalkanoate) resin is not limited to a particular technique, and may be a chemical synthesis production method or a microbial production method. A microbial production method is more preferred. The microbial production method used can be any known method. Known examples of bacteria that produce copolymers of 3-hydroxybutyrate with other hydroxyalkanoates include *Aeromonas caviae* which is a P3HB3HV- and P3HB3HH-producing bacterium and *Alcaligenes eutrophus* which is a P3HB4HB-producing bacterium. In particular, in order to increase the P3HB3HH productivity, *Alcaligenes eutrophus* AC32 (FERM BP-6038; see T. Fukui, Y Doi, *J. Bacteriol.*, 179, pp. 4821-4830 (1997)) having a P3HA synthase gene introduced is more preferred. Such a microorganism is cultured under suitable conditions to allow the microorganism to accumulate P3HB3HH in its cells, and the microbial cells accumulating P3HB3HH are used. Instead of the above microorganism, a genetically modified microorganism having any suitable poly(3-hydroxyalkanoate) resin synthesis-related gene introduced may be used depending on the poly(3-hydroxyalkanoate) resin to be produced. The culture conditions including the type of the substrate may be optimized depending on the poly(3-hydroxyalkanoate) resin to be produced. Through these procedures, the content of the 3-hydroxybutyrate units in the poly(3-hydroxyalkanoate) resin can be adjusted.

The method for obtaining the poly(3-hydroxyalkanoate) resin meeting the above-described requirements concerning the weight-average molecular weight and the amount of the low-molecular-weight component is not limited to a particular technique, and any known technique for molecular weight adjustment of polyesters can be used. An exemplary method is to mix two or more poly(3-hydroxyalkanoate) resins having different molecular weights after adjusting the molecular weight of each resin where necessary.

A specific example of the method is to blend a high-molecular-weight poly(3-hydroxyalkanoate) resin having a weight-average molecular weight of $30\times10^4$ to $60\times10^4$ (preferably $35\times10^4$ to $50\times10^4$) and a low-molecular-weight poly (3-hydroxyalkanoate) resin having a weight-average molecular weight of $8\times10^4$ to $22\times10^4$ (preferably $10\times10^4$ to $20\times10^4$) and thereby adjust the overall weight-average molecular weight and the amount of the low-molecular-weight component. The proportions in which the high-molecular-weight and low-molecular-weight resins are used may be set as appropriate. For example, the weight ratio between the high-molecular-weight and low-molecular-weight resins is preferably from 10:90 to 90:10, more preferably from 20:80 to 80:20, and even more preferably from 30:70 to 70:30.

The resin component of the resin composition for injection molding may consist only of the poly(3-hydroxyalkanoate) resin or may further include an additional resin that is not classified as a poly(3-hydroxyalkanoate) resin. Examples of the additional resin include: aliphatic polyester resins such as polylactic acid, polybutylene succinate adipate, polybutylene succinate, and polycaprolactone; and aliphatic-aromatic polyester resins such as polybutylene adipate terephthalate, polybutylene sebacate terephthalate, and polybutylene azelate terephthalate. The resin component may include only one additional resin or two or more additional resins.

The amount of the additional resin is not limited to a particular range, but is preferably small in terms of the seawater degradabilities of the resin composition for injection molding and the injection-molded article. To be specific, the amount of the additional resin is preferably 35 parts by weight or less, more preferably 30 parts by weight or less, even more preferably 20 parts by weight or less, and still even more preferably 10 parts by weight or less per 100 parts by weight of the poly(3-hydroxyalkanoate) resin. The lower limit of the amount of the additional resin is not limited to a particular value and may be 0 part by weight.

[Inorganic Filler]

The resin composition for injection molding need not contain any inorganic filler, but preferably contains an inorganic filler in terms of increasing the strength of the injection-molded article.

The inorganic filler is not limited to a particular type, and may be any inorganic filler that can be added to the resin material for injection molding. Examples of the inorganic filler include: silica-based inorganic fillers such as quartz, fumed silica, silicic anhydride, molten silica, crystalline silica, amorphous silica, a filler obtained by condensation of alkoxysilane, and ultrafine amorphous silica; and other inorganic fillers such as alumina, zircon, iron oxide, zinc oxide, titanium oxide, silicon nitride, boron nitride, aluminum nitride, silicon carbide, glass, silicone rubber, silicone resin, titanium oxide, carbon fiber, mica, black lead, carbon black, ferrite, graphite, diatomite, white clay, clay, talc, calcium carbonate, manganese carbonate, magnesium carbonate, barium sulfate, and silver powder. One of these fillers may be used alone, or two or more thereof may be used in combination.

The inorganic filler may be surface-treated in order to increase its dispersibility in the resin composition for injection molding. Examples of the treatment agent used for the surface treatment include higher fatty acids, silane coupling agents, titanate coupling agents, sol-gel coating agents, and resin coating agents.

The water content of the inorganic filler is preferably from 0.01 to 10%, more preferably from 0.01 to 5%, and even more preferably from 0.01 to 1% in order to reliably inhibit hydrolysis of the poly(3-hydroxyalkanoate) resin. The water content can be determined according to JIS K 5101.

The average particle size of the inorganic filler is preferably from 0.1 to 100 μm, more preferably from 0.1 to 50 μm, even more preferably from 0.1 to 30 μm, and particularly preferably from 0.1 to 15 μm in order to ensure good properties and high processability of the resin composition for injection molding. The average particle size can be measured using a laser diffraction/scattering particle size analyzer such as "Microtrac MT3100II" manufactured by Nikkiso Co., Ltd.

Among inorganic fillers, those belonging to silicates are preferred since such fillers can provide an increase in heat resistance and improvement in processability. Among silicates, at least one selected from the group consisting of talc, mica, kaolinite, montmorillonite, and smectite is preferred since these silicates provide a significant increase in the mechanical strength of the injection-molded article and have such a narrow particle size distribution as to cause less deterioration in surface smoothness and mold surface transferability. Two or more silicates may be used in combination and, in this case, the types and proportions of the silicates can be adjusted as appropriate.

Examples of the talc include general-purpose talc and surface-treated talc, specific examples of which include "MICRO ACE™" manufactured by Nippon Talc Co., Ltd., "Talcum Powder™" manufactured by Hayashi Kasei Co., Ltd., and talc manufactured by Takehara Kagaku Kogyo Co., Ltd. or Maruo Calcium Co., Ltd.

Examples of the mica include wet-ground mica and dry-ground mica, specific examples of which include mica manufactured by Yamaguchi Mica Co., Ltd. or Keiwa Rozai Co., Ltd.

Examples of the kaolinite include dry kaolin, calcined kaolin, and wet kaolin, specific examples of which include "TRANSLINK™", ASP™, "SANTINTONE™", and "ULTREX™" manufactured by Hayashi Kasei Co., Ltd. and kaolinite manufactured by Keiwa Rozai Co., Ltd.

When the resin composition for injection molding contains such an inorganic filler as described above, the amount of the inorganic filler is preferably from 1 to 50 parts by weight per 100 parts by weight of the total resin component including the poly(3-hydroxyalkanoate) resin in terms of increasing the strength of the injection-molded article and ensuring the fluidity of the resin composition. The amount of the inorganic filler is more preferably from 5 to 40 parts by weight and even more preferably from 10 to 30 parts by weight.

(Additives)

The resin composition for injection molding may contain additives other than inorganic fillers to the extent that the additives do not impair the effect of the invention. Examples of the additives include a nucleating agent, a lubricant, a plasticizer, an antistatic, a flame retardant, a conductive additive, a heat insulator, a crosslinking agent, an antioxidant, an ultraviolet absorber, a colorant, an organic filler, and a hydrolysis inhibitor, and these additives can be used depending on the intended purpose. Biodegradable additives are particularly preferred.

Examples of the nucleating agent include pentaerythritol, orotic acid, aspartame, cyanuric acid, glycine, zinc phenylphosphonate, and boron nitride. Poly(3-hydroxybutyrate) can also be added as the nucleating agent. Among these compounds, pentaerythritol is preferred because it is particularly superior in the accelerating effect on crystallization of the poly(3-hydroxyalkanoate) resin. One nucleating agent may be used alone, or two or more nucleating agents may be mixed. The mix proportions of the nucleating agents can be adjusted as appropriate depending on the intended purpose. The resin composition for injection molding may be one that does not contain any nucleating agent (in particular, pentaerythritol), and even in this case burr formation in the injection-molded article can be reduced.

When a nucleating agent other than poly(3-hydroxybutyrate) is used, the amount of the nucleating agent is not limited to a particular range, but is preferably from 0.1 to 10 parts by weight, more preferably from 0.5 to 8.5 parts by weight, even more preferably from 0.7 to 6 parts by weight, and particularly preferably from 0.8 to 3 parts by weight per 100 parts by weight of the poly(3-hydroxyalkanoate) resin. When poly(3-hydroxybutyrate) is added as a nucleating agent, the amount of the poly(3-hydroxybutyrate) is not limited to a particular range, but is preferably from 0.1 to 15 parts by weight, more preferably from 1 to 10 parts by weight, even more preferably from 3 to 8 parts by weight, and particularly preferably from 4 to 7 parts by weight per 100 parts by weight of the poly(3-hydroxyalkanoate) resin exclusive of the poly(3-hydroxybutyrate).

Examples of the lubricant include behenamide, oleamide, erucamide, stearamide, palmitamide, N-stearyl behenamide, N-stearyl erucamide, ethylenebisstearamide, ethylenebisoleamide, ethylenebiserucamide, ethylenebislauramide, ethylenebiscapramide, p-phenylenebisstearamide, and a polycondensation product of ethylenediamine, stearic acid, and sebacic acid. Among these, behenamide and erucamide are preferred because they are particularly superior in the lubricating effect on the poly(3-hydroxyalkanoate) resin. The amount of the lubricant used is not limited to a particular range, but is preferably from 0.01 to 5 parts by weight, more preferably from 0.05 to 3 parts by weight, and even more preferably from 0.1 to 1.5 parts by weight per 100 parts by weight of the poly(3-hydroxyalkanoate) resin. One lubricant may be used alone, or two or more lubricants may be mixed. The mix proportions of the lubricants can be adjusted as appropriate depending on the intended purpose.

Examples of the plasticizer include glycerin ester compounds, citric ester compounds, sebacic ester compounds, adipic ester compounds, polyether ester compounds, benzoic ester compounds, phthalic ester compounds, isosorbide ester compounds, polycaprolactone compounds, and dibasic ester compounds. Among these, glycerin ester compounds, citric ester compounds, sebacic ester compounds, and dibasic ester compounds are preferred because they are particularly superior in the plasticizing effect on the poly(3-hydroxyalkanoate) resin. Examples of the glycerin ester compounds include glycerin diacetomonolaurate. Examples of the citric ester compounds include tributyl acetylcitrate. Examples of the sebacic ester compounds include dibutyl sebacate. Examples of the dibasic ester compounds include benzyl methyl diethylene glycol adipate. The amount of the plasticizer used is not limited to a particular range, but is preferably from 0 to 20 parts by weight, more preferably from 0 to 15 parts by weight, even more preferably from 0 to 10 parts by weight, and particularly preferably from 0 to 5 parts by weight per 100 parts by weight of the total resin component including the poly(3-hydroxyalkanoate) resin. One plasticizer may be used alone, or two or more plasticizers may be mixed. The mix proportions of the plasticizers can be adjusted as appropriate depending on the intended purpose.

[Method for Producing Injection-Molded Article]

The following describes the details of the method for producing an injection-molded article made of the resin composition for injection molding.

First, the poly(3-hydroxyalkanoate) resin including at least one copolymer of 3-hydroxybutyrate units and other hydroxyalkanoate units is melted and kneaded, together with an additional resin, an inorganic filler, and other additives added as necessary, by using a device such as an extruder, a kneader, a Banbury mixer, or a roll mill, and thus a resin composition is prepared. The resin composition is extruded into a strand, which is then cut to obtain pellets in the form of cylindrical, elliptic cylindrical, spherical, cubic, or rectangular parallelepiped-shaped particles. Desirably, the pellets thus made are thoroughly dried at 40 to 80° C. to remove water before they are subjected to injection molding.

The temperature for the melting and kneading depends on the properties such as melting point and melt viscosity of the resins used and cannot be definitely specified. The resin temperature of the melted kneaded product at the die outlet is preferably from 140 to 190° C., more preferably from 145 to 185° C., and even more preferably from 150 to 180° C. If the resin temperature of the melted kneaded product is lower than 140° C., the resin component including the poly(3-hydroxyalkanoate) resin could remain unmelted. If the resin temperature is higher than 190° C., the resin component including the poly(3-hydroxyalkanoate) resin could be thermally decomposed.

Next, the pellets made as above are subjected to injection molding. Thus, an injection-molded article can be formed. The injection molding is a process in which a resin composition heated and melted is injected into a mold and cooled and solidified in the mold and subsequently the mold is opened to release the molded article from the mold. The injection molding process used can be any injection molding process commonly used for molding of thermoplastic resins. Other examples include gas-assisted injection molding, injection compression molding, and injection blow molding (including one-step molding and two-step molding). In-mold injection molding, gas pressure injection molding, double molding, sandwich molding, push-pull injection molding, or SCORIM can also be used. Usable injection molding processes are not limited to those mentioned above.

The temperature for the post-injection cooling in the mold is preferably, for example, from 20 to 70° C., more preferably from 25 to 60° C., even more preferably from 30 to 50° C., and particularly preferably from 35 to 45° C.

The resulting injection-molded article has high heat resistance and has a good appearance as a result of reduced burr formation. The effort spent on a post-molding process for burr removal can be eliminated or reduced. Additionally, since the resin component is mainly composed of the poly(3-hydroxyalkanoate) resin, the injection-molded article is degradable in seawater and can thus be a solution to environmental problems caused by sea dumping of plastics.

The use of the injection-molded article is not limited to a particular product, and exemplary products include: dinnerware such as dishes, drinking cups, other cups, lids, and trays; cutlery such as spoons, forks, knives, and muddlers; capsules such as coffee capsules and toy capsules; toy products; materials for agriculture; parts of OA equipment; parts of home electric appliances; parts of automobiles; various kinds of containers and boxes; daily sundries; stationery products; and bottles.

EXAMPLES

Hereinafter, the present invention will be specifically described using examples. The technical scope of the present invention is not limited by the examples given below.

(Raw Materials)

Commercially-available products listed in Table 1 were used as raw materials.

Columns: K-G (one column) and K-806 L (two columns) manufactured by Showa Denko K.K.

Sample concentration: 3 mg/ml

Eluent: Chloroform solvent

Eluent flow rate: 1.0 ml/min

Sample injection amount: 100 μL

Analysis time: 30 minutes

Standard sample: Polystyrene

TABLE 1

| | Abbreviation | Product name | Manufacturer | Chemical name | Weight-average molecular weight | Average HB content (mol %) |
|---|---|---|---|---|---|---|
| Poly(3-hydroxyalkanoate) | PHA-A | Kaneka Biodegradable Polymer PHBH 4303-1 | Kaneka | Poly(3-hydroxybutyrate-co-3-hydroxyhexanoate) | $38.2 \times 10^4$ | 95.4% |
| | PHA-B | Kaneka Biodegradable Polymer PHBH 4303-2 | Kaneka | Poly(3-hydroxybutyrate-co-3-hydroxyhexanoate) | $47.0 \times 10^4$ | 94.4% |
| | PHA-C | Kaneka Biodegradable Polymer PHBH 5302 | Kaneka | Poly(3-hydroxybutyrate-co-3-hydroxyhexanoate) | $24.1 \times 10^4$ | 94.2% |
| | PHA-D | Kaneka Biodegradable Polymer PHBH 1303 | Kaneka | Poly(3-hydroxybutyrate-co-3-hydroxyhexanoate) | $75.2 \times 10^4$ | 94.2% |
| | PHA-E | Kaneka Biodegradable Polymer PHBH 1504 | Kaneka | Poly(3-hydroxybutyrate-co-3-hydroxyhexanoate) | $55.4 \times 10^4$ | 38.8% |
| | PHA-F | Kaneka Biodegradable Polymer PHBH 7302 | Kaneka | Poly(3-hydroxybutyrate-co-3-hydroxyhexanoate) | $12 \times 10^4$ | 94.5% |
| Inorganic filler | Tak | MICRO ACE K-1 | Nippon Talc | Talc | | |
| Nucleating agent | PETL | Neulizer P | Mitsubishi Chemical | Pentaerythritol | | |
| Lubricant | BA | BNT-22H | Nippon Fine Chemical | Behenamide | | |

(Adjustment of Resin Molecular Weight)

Some of the poly(3-hydroxyalkanoate) resins listed in Table 1 were used as raw materials. Each resin was put into a metal container, and the metal container was placed into a pressure cooker tester (HAST CHAMBER EHS-221M manufactured by ESPEC Corporation), in which the resin was hydrolyzed to adjust its molecular weight. The temperature and time of the hydrolysis were as shown in Table 2.

TABLE 2

| | Abbreviation | Raw Material | Pressure cooker conditions | Weight-average molecular weight |
|---|---|---|---|---|
| Poly(3-hydroxy-alkanoate) | PHA-A2 | PHA-A | 120° C. × 13 hr | $14.5 \times 10^4$ |
| | PHA-C2 | PHA-C | 120° C. × 2 hr | $19.0 \times 10^4$ |
| | PHA-C3 | PHA-C | 120° C. × 4 hr | $14.9 \times 10^4$ |
| | PHA-C4 | PHA-C | 120° C. × 4.5 hr | $13.2 \times 10^4$ |
| | PHA-C5 | PHA-C | 120° C. × 5 hr | $10.9 \times 10^4$ |
| | PHA-C6 | PHA-C | 120° C. × 8 hr | $7.1 \times 10^4$ |
| | PHA-C7 | PHA-C | 120° C. × 13 hr | $4.5 \times 10^4$ |
| | PHA-E2 | PHA-E | 110° C. × 12 hr | $35 \times 10^4$ |

(Method for Measuring Weight-Average Molecular Weight of Poly(3-hydroxyalkanoate) Resin Before Blending)

The weight-average molecular weight of each of the poly(3-hydroxyalkanoate) resins listed in Tables 1 and 2 was measured as follows. First, the poly(3-hydroxyalkanoate) resin was allowed to stand in chloroform at 60° C. for 30 minutes, after which the chloroform was stirred to dissolve the poly(3-hydroxyalkanoate). The resulting solution was filtered through a disposable filter made of PTFE and having a pore size of 0.45 μm. Subsequently, the filtrate was subjected to GPC analysis under the conditions listed below, and thus the weight-average molecular weight was determined. The results are shown in Tables 1 and 2.

GPC system: RI monitor (L-3000) manufactured by Hitachi (Method for Measuring Weight-Average Molecular Weight of Poly(3-hydroxyalkanoate) Resin after Compounding)

The weight-average molecular weight of each of the poly(3-hydroxyalkanoate) resins resulting from compounding in Examples and Comparative Examples was measured by a method identical to that described above in "Method for Measuring Weight-Average Molecular Weight of Poly(3-hydroxyalkanoate) Resin before Blending", except that the poly(3-hydroxyalkanoate) resins were used in the form of pellets as described later and that insoluble substances were removed by centrifugation before filtration through a disposable filter made of PTFE and having a pore size of 0.45 μm. The results are shown in Table 4.

(Method for Calculating Proportion of Component Having Weight Molecular Weight of 20×10⁴ or less in Poly(3-hydroxyalkanoate) Resin after Compounding)

The abscissa and ordinate of the weight molecular weight distribution obtained by the GPC analysis were converted into the logarithm of weight molecular weight and the cumulative percentage (%), respectively, to create a cumulative weight molecular weight distribution, from which the value of the cumulative percentage (%) at the weight-average molecular weight of $20 \times 10^4$ (logarithmic value=5.3) was read as the proportion (wt %) of the component having a weight molecular weight of $20 \times 10^4$ or less (see FIGURE). The weight molecular weight region up to 1000 was excluded to eliminate the influence of other components such as the additives. The results are shown in FIGURE.

<Production Example of Polymer Nucleating Agent>

Poly(3-hydroxybutyrate) as a polymer nucleating agent was produced by culture of *C. necator* H16 (ATCC 17699).

The seed culture medium was composed of 1 w/v % Meat-extract, 1 w/v % Bacto-Tryptone, 0.2 w/v % Yeast-extract, 0.9 w/v % $Na_2HPO_4 \cdot 12H_2O$, and 0.15 w/v % $KH_2PO_4$ (pH=6.8).

13

14

The preculture medium was composed of 1.1 w/v % $Na_2HPO_4 \cdot 12H_2O$, 0.19 w/v % $KH_2PO_4$, 1.29 w/v % $(NH_4)_2SO_4$, 0.1 w/v % $MgSO_4 \cdot 7H_2O$, 2.5 w/v % palm olein oil, and 0.5 v/v % trace metal salt solution (solution of 1.6 w/v % $FeCl_3 \cdot 6H_2O$, 1 w/v % $CaCl_2 \cdot 2H_2O$, 0.02 w/v % $CoCl_2 \cdot 6H_2O$, 0.016 w/v % $CuSO_4 \cdot 5H_2O$, and 0.012 w/v % $NiCl_2 \cdot 6H_2O$ in 0.1N hydrochloric acid). Palm olein oil was added as a carbon source in a concentration of 10 g/L at one time.

The PHB production culture medium was composed of 0.385 w/v % $Na_2HPO_4 \cdot 12H_2O$, 0.067 w/v % $KH_2PO_4$, 0.291 w/v % $(NH_4)_2SO_4$, 0.1 w/v % $MgSO_4 \cdot 7H_2O$, and 0.5 v/v % trace metal salt solution (solution of 1.6 w/v % $FeCl_3 \cdot 6H_2O$, 1 w/v % $CaCl_2 \cdot 2H_2O$, 0.02 w/v % $CoCl_2 \cdot 6H_2O$, 0.016 w/v % $CuSO_4 \cdot 5H_2O$, and 0.012 w/v % $NiCl_2 \cdot 6H_2O$ in 0.1N hydrochloric acid).

First, glycerol stocks (50 µl each) of the strain H16 were each inoculated into the seed culture medium (10 ml) and cultured for 24 hours to accomplish seed culture. Subsequently, the seed culture fluid was inoculated at a concentration of 1.0 v/v % into a 3 L jar fermenter (MDL-300, manufactured by B.E. Marubishi Co., Ltd.) containing 1.8 L of the preculture medium. The fermenter was operated at a culture temperature of 33° C., a stirring speed of 500 rpm, and an aeration of 1.8 L/min, and the preculture was conducted for 28 hours during which the pH was controlled between 6.7 and 6.8. For the pH control, a 14% aqueous solution of ammonium hydroxide was used.

Next, the preculture fluid was inoculated at a concentration of 5.0 v/v % into a 5 L jar fermenter (MDS-U50, manufactured by B.E. Marubishi Co., Ltd.) containing 2.5 L of the PHA production culture medium. The fermenter was operated at a culture temperature of 33° C., a stirring speed of 420 rpm, and an aeration of 2.1 L/min, and the pH was controlled between 6.7 and 6.8. For the pH control, a 25% aqueous solution of ammonium hydroxide was used. The carbon source was added intermittently. Palm olein oil was used as the carbon source, and the culture was conducted for 48 hours. At the end of the culture, a sample of the culture fluid was obtained and subjected to HPLC analysis, which confirmed that poly(3-hydroxybutyrate) was produced. After the end of the culture, the microbial cells were collected by centrifugation, washed with methanol, and freeze-dried. The weight of the dried microbial cells was measured.

Chloroform was added to the microbial cells in a volume of 100 ml per g of the microbial cells, and the microbial cells in chloroform were stirred at room temperature for a day to extract the polymer nucleating agent from the microbial cells. The residual microbial cells were removed by filtration, and the filtrate was concentrated using an evaporator to a total volume of 30 vol %. Hexane was slowly added to the concentrate in a volume of 90 ml per g of the microbial cells, and the mixture was left for 1 hour under gentle stirring. The polymer nucleating agent precipitated was collected by filtration and vacuum-dried at 50° C. for 3 hours. In this manner, the polymer nucleating agent was obtained.

<Example 1> (Preparation of PHBH Blend)

An amount of 5 kg of PHA-A, 5 kg of PHA-05, and 100 g of BA were placed into 75 L Super Mixer manufactured by Kawata Mfg. Co., Ltd. and were stirred at 300 rpm for 3 minutes to obtain a PHBH blend.
(Compounding)

TEM26SS (L/D=60) manufactured by Toshiba Machine Co., Ltd. was used. In this machine, screw configurations listed in Table 3 were employed, and the screw rotational speed was set to 100 rpm. The PHBH blend was fed from the base of the screw at a rate of 10.1 kg/hr, and talc was fed by a side feeder at a rate of 2.0 kg/hr. The extruded strand was passed through a water bath filled with 45° C. hot water to solidify the strand, which was then cut into pellets by a pelletizer.

TABLE 3

| Cylinder | Screw configuration | Accessory equipment | Barrel setting temperature (° C.) |
|---|---|---|---|
| Cylinder 1 | Full flight | Main feeder (base of screw) | Water cooling (20 ± 5) |
| Cylinder 2 | Full flight | | 140 |
| Cylinder 3 | Full flight | | 140 |
| Cylinder 4 | Full flight | | 140 |
| Cylinder 5 | Full flight | | 140 |
| Cylinder 6 | Full flight | | 140 |
| Cylinder 7 | Kneading | | 140 |
| Cylinder 8 | Kneading | | 140 |
| Cylinder 9 | Full flight | | 140 |
| Cylinder 10 | Full flight | Open vent | 140 |
| Cylinder 11 | Full flight | Side feeder | 140 |
| Cylinder 12 | Kneading | | 140 |
| Cylinder 13 | Full flight | | 140 |
| Cylinder 14 | Full flight | Open vent | 140 |
| Cylinder 15 | Full flight | | 140 |
| Die | | | 140 |

(Obtainment of Injection-Molded Articles)

The pellets were used to perform injection molding as follows. Spoon-shaped molds were used, and Si-30V, an injection molding machine manufactured by Toyo Machinery & Metal Co., Ltd, was used. The temperature conditions were set to nozzle/T1/T2/T3=155/145/135/125° C., the injection rate was set to 20 mm/sec, and the mold temperature was set to 35° C. The shot size was minimized to the extent that short shot would not occur. By the injection molding, a large spoon having a length of 13.3 cm, a bowl thickness of 1 mm, and a handle thickness of 2 mm and a small spoon having a length of 9.8 cm, a bowl thickness of 1 mm, and a handle thickness of 1.5 mm were obtained.

The large spoon was used for burr formation evaluation described below, and the small spoon was used for high-temperature break evaluation described below. The evaluation results are shown in Table 4.
(Method for Burr Formation Evaluation)

A tip portion of the large spoon other than that corresponding to a vent zone was observed with an optical microscope, and ratings on burr formation were made according to the following criteria.

Excellent: The burr size was less than 5 µm

Good: The burr size was from 5 µm to less than 15 µm.

Average: The burr size was from 15 µm to less than 30 µm.

Poor: The burr size was 30 µm or more.
(Method for High-Temperature Break Evaluation)

The small spoon was immersed in 90° C. hot water. In the immersion, the spoon was placed upright with its bowl pointed downward, and the tip of the bowl was brought into contact with the bottom of the water container in such a way that the upper end of the handle was 2 cm above the water surface. The spoon was held in this position for 20 seconds. After that, a force was applied to the end of the handle to push the handle downward by 5 mm and bend the spoon, and then the force was removed to restore the spoon to its original shape. This bending action was repeated 20 times.

A score of "Good" was given when the spoon was not broken, while a score of "Poor" was given when the spoon was broken.

<Example 2> (Preparation of PHBH Blend)

Injection-molded articles were obtained and evaluated in the same manner as in Example 1, except that PHA-C5 was replaced with PHA-C4.

<Example 3> (Preparation of PHBH Blend)

Injection-molded articles were obtained and evaluated in the same manner as in Example 1, except that PHA-C5 was replaced with PHA-C3.

<Example 4> (Preparation of PHBH Blend)

Injection-molded articles were obtained and evaluated in the same manner as in Example 1, except that PHA-C5 was replaced with PHA-C2.

<Example 5> (Preparation of PHBH Blend)

Injection-molded articles were obtained and evaluated in the same manner as in Example 1, except that PHA-A was replaced with PHA-B.

<Example 6> (Preparation of PHBH Blend)

Injection-molded articles were obtained and evaluated in the same manner as in Example 1, except that PHA-05 was replaced with PHA-F.

<Example 7> (Preparation of PHBH Blend)

Injection-molded articles were obtained and evaluated in the same manner as in Example 1, except that 5.0 kg of PHA-A was replaced with 3.5 kg of PHA-A and 1.5 kg of PHA-E2.

<Example 8> (Preparation of PHBH Blend)

Injection-molded articles were obtained and evaluated in the same manner as in Example 1, except that 100 g of PETL was added in the preparation of the PHBH blend and that the rate of discharge of the PHBH blend fed from the base of the screw in the compounding step was 10.15 kg/hr.

<Example 9> (Preparation of PHBH Blend)

Injection-molded articles were obtained and evaluated in the same manner as in Example 8, except that PHA-C5 was replaced with PHA-A2 and that the rate of discharge of the PHBH blend fed from the base of the screw in the compounding step was 10.15 kg/hr.

<Example 10> (Preparation of PHBH Blend)

Injection-molded articles were obtained and evaluated in the same manner as in Example 9, except that 400 g of the polymer nucleating agent was added instead of PETL and that the rate of discharge of the PHBH blend fed from the base of the screw in the compounding step was 10.45 kg/hr.

<Example 11> (Preparation of PHBH Blend)

Injection-molded articles were obtained and evaluated in the same manner as in Example 9, except that 550 g of the polymer nucleating agent was added instead of PETL and that the rate of discharge of the PHBH blend fed from the base of the screw in the compounding step was 10.6 kg/hr.

<Comparative Example 1> (Preparation of PHBH Blend)

Injection-molded articles were obtained and evaluated in the same manner as in Example 1, except that PHA-C5 was replaced with PHA-C7.

<Comparative Example 2> (Preparation of PHBH Blend)

Injection-molded articles were obtained and evaluated in the same manner as in Example 1, except that PHA-C5 was replaced with PHA-C6.

<Comparative Example 3> (Preparation of PHBH Blend)

Injection-molded articles were obtained and evaluated in the same manner as in Example 1, except that PHA-C5 was replaced with PHA-C.

<Comparative Example 4> (Preparation of PHBH Blend)

Injection-molded articles were obtained and evaluated in the same manner as in Example 1, except that PHA-A was replaced with PHA-D.

<Comparative Example 5> (Preparation of PHBH Blend)

Injection-molded articles were obtained and evaluated in the same manner as in Example 1, except that PHA-A was replaced with PHA-E2 and that PHA-C5 was replaced with PHA-C3.

<Comparative Example 6> (Preparation of PHBH Blend)

Injection-molded articles were obtained and evaluated in the same manner as in Example 2, except that the amount of PHA-A was changed from 5 kg to 4 kg and that the amount of PHA-C4 was changed from 5 kg to 6 kg.

<Comparative Example 7> (Preparation of PHBH Blend)

Injection-molded articles were obtained and evaluated in the same manner as in Example 2, except that the amount of PHA-A was changed from 5 kg to 3 kg and that the amount of PHA-C4 was changed from 5 kg to 7 kg.

<Comparative Example 8> (Preparation of PHBH Blend)

Injection-molded articles were obtained and evaluated in the same manner as in Example 1, except that 10 kg of PHA-C was used instead of PHA-A and PHA-C5.

Table 4 lists the following information: the types and amounts (parts by weight) of the materials used in Examples and Comparative Examples; the average 3-hydroxybutyrate unit content (average HB content), the weight-average molecular weight, and the low-molecular-weight component content of the resins; and the results of the burr formation evaluation and high-temperature break evaluation.

TABLE 4

| | | Examples | | | | | | | | |
| --- | --- | --- | --- | --- | --- | --- | --- | --- | --- | --- |
| | | 1 | 2 | 3 | 4 | 5 | 6 | 7 | 8 | 9 |
| Materials (parts by weight) | PHA-A | 50 | 50 | 50 | 50 | | 50 | 35 | 50 | 50 |
| | PHA-B | | | | | 50 | | | | |
| | PHA-A2 | | | | | | | | | 50 |
| | PHA-D | | | | | | | | | |
| | PHA-E2 | | | | | | | 15 | | |
| | PHA-C | | | | | | | | | |
| | PHA-C2 | | | | 50 | 50 | | | | |
| | PHA-C3 | | | 50 | | | | | | |
| | PHA-C4 | | 50 | | | | | | | |
| | PHA-C5 | 50 | | | | | | 50 | 50 | |
| | PHA-C6 | | | | | | | | | |
| | PHA-C7 | | | | | | | | | |
| | PHA-F | | | | | | 50 | | | |
| | Polymer nucleating agent PETL | | | | | | | | 1 | 1 |
| | BA | 1 | 1 | 1 | 1 | 1 | 1 | 1 | 0.5 | 0.5 |
| | Talc | 20 | 20 | 20 | 30 | 20 | 20 | 20 | 20 | 20 |
| Physical properties of P3HA | Weight-average molecular weight | 22.4 | 23.2 | 24.5 | 25.9 | 26.0 | 23.1 | 22.5 | 22.7 | 23.8 |
| | Proportion of component having weight-average molecular weight of $20 \times 10^4$ (wt %) | 51.3 | 41.2 | 39.6 | 37.1 | 43.4 | 45.3 | 42.9 | 51.3 | 40.1 |
| | Average HB content (mol %) | 94.3 | 94.3 | 94.3 | 94.3 | 93.8 | 95.0 | 93.2 | 94.3 | 95.4 |
| Ratings | Burr | Excellent | Excellent | Good | Good | Good | Excellent | Excellent | Excellent | Excellent |
| | High-temperature break | Good | Good | Good | Good | Good | Good | Good | Good | Good |

| | | Examples | | Comparative Examples | | | | | | | |
| --- | --- | --- | --- | --- | --- | --- | --- | --- | --- | --- | --- |
| | | 10 | 11 | 1 | 2 | 3 | 4 | 5 | 6 | 7 | 8 |
| Materials (parts by weight) | PHA-A | 50 | 50 | 50 | 50 | 50 | | | | 40 | 30 |
| | PHA-B | | | | | | | | | | |
| | PHA-A2 | 50 | 50 | | | | | | | | |
| | PHA-D | | | | | | 50 | | | | |
| | PHA-E2 | | | | | | | 50 | | | |
| | PHA-C | | | | | 50 | | | | | 100 |
| | PHA-C2 | | | | | | | | | | |
| | PHA-C3 | | | | | | | 50 | | | |
| | PHA-C4 | | | | | | | | 60 | 70 | |
| | PHA-C5 | | | | | | 50 | | | | |
| | PHA-C6 | | | | 50 | | | | | | |
| | PHA-C7 | | | 50 | | | | | | | |
| | PHA-F | | | | | | | | | | |
| | Polymer nucleating agent PETL | 4 | 5.5 | | | | | | | | |
| | BA | 0.5 | 0.5 | 1 | 1 | 1 | 1 | 1 | 1 | 1 | 1 |
| | Talc | 20 | 20 | 20 | 20 | 20 | 20 | 20 | 20 | 20 | 20 |
| Physical properties of P3HA | Weight-average molecular weight | 23.7 | 23.7 | 18.3 | 20.7 | 28.4 | 39.5 | 23.1 | 20.8 | 17.1 | 21.9 |
| | Proportion of component having weight-average molecular weight of $20 \times 10^4$ (wt %) | 41.2 | 41.8 | 72.1 | 65.6 | 34.2 | 28.3 | 42.1 | 23.2 | 70.1 | 63.2 |
| | Average HB content (mol %) | 95.4 | 95.4 | 94.3 | 94.3 | 94.3 | 93.7 | 90.7 | 94.1 | 93.9 | 93.2 |
| Ratings | Burr | Excellent | Excellent | Average | Good | Poor | Average | Poor | Good | Good | Poor |
| | High-temperature break | Good | Good | Poor | Poor | Good | Good | Good | Poor | Poor | Poor |

Table 4 reveals the following findings. The injection-molded articles obtained in Examples 1 to 11 were small in burr size. Additionally, the injection-molded articles were resistant to break at high temperature and demonstrated to be suitable for use at high temperature.

In contrast, the injection-molded articles obtained in Comparative Examples 1 to 8, each of which did not meet one or more of the requirements concerning the average HB content, the weight-average molecular weight, and the low-molecular-weight component content of the poly(3-hydroxyalkanoate) resin, were large in burr size, or were prone to break at high temperature and demonstrated to be unsuitable for use at high temperature.

The invention claimed is:

1. A resin composition for injection molding, comprising a poly(3-hydroxyalkanoate) resin, wherein the poly(3-hydroxyalkanoate) resin consists of at least one copolymer of 3-hydroxybutyrate units and other hydroxyalkanoate units, and optionally a homopolymer of 3-hydroxybutyrate, an average content of the 3-hydroxybutyrate units in the poly(3-hydroxyalkanoate) resin is from 92 to 99 mol %, a polystyrene-equivalent weight-average molecular weight of the poly(3-hydroxyalkanoate) resin, as measured by gel permeation chromatography using a chloroform solvent, is from $21\times10^4$ to $38\times10^4$, and in a weight molecular weight distribution of the poly(3-hydroxyalkanoate) resin, a proportion of a poly(3-hydroxyalkanoate) having a weight molecular weight of $20\times10^4$ or less is from 35 to 60 wt %.

2. The resin composition according to claim 1, wherein the at least one copolymer of 3-hydroxybutyrate units and other hydroxyalkanoate units is at least one selected from the group consisting of poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate).

3. The resin composition according to claim 2, wherein the poly(3-hydroxyalkanoate) resin is poly(3-hydroxybutyrate-co-3-hydroxyhexanoate).

4. The resin composition according to claim 1, wherein the resin composition optionally comprises a resin other than the poly(3-hydroxyalkanoate) resin in an amount of 35 parts or less by weight per 100 parts by weight of the poly(3-hydroxyalkanoate) resin.

5. The resin composition according to claim 1, further comprising a nucleating agent, a lubricant, or a combination thereof.

6. The resin composition according to claim 1, further comprising from 1 to 50 parts by weight of an inorganic filler per 100 parts by weight of a total resin component comprising the poly(3-hydroxyalkanoate) resin.

7. The resin composition according to claim 6, wherein the inorganic filler is a silicate.

8. The resin composition according to claim 7, wherein the silicate comprises at least one selected from the group consisting of talc, mica, kaolinite, montmorillonite, and smectite.

9. An injection-molded article comprising the resin composition according to claim 1.

10. The resin composition according to claim 1, wherein the average content of the 3-hydroxybutyrate units in the poly(3-hydroxyalkanoate) resin is from 93 mol % to 98 mol %.

11. The resin composition according to claim 1, wherein the average content of the 3-hydroxybutyrate units in the poly(3-hydroxyalkanoate) resin is from 94 mol % to 97 mol %.

12. The resin composition according to claim 1, wherein the polystyrene-equivalent weight-average molecular weight of the poly(3-hydroxyalkanoate) resin is from $22\times10^4$ to $35\times10^4$.

13. The resin composition according to claim 1, wherein the polystyrene-equivalent weight-average molecular weight of the poly(3-hydroxyalkanoate) resin is from $22\times10^4$ to $30\times10^4$.

14. The resin composition according to claim 1, wherein in the weight molecular weight distribution of the poly(3-hydroxyalkanoate) resin, the proportion of a poly(3-hydroxyalkanoate) having a weight molecular weight of $20\times10^4$ or less is from 35 to 55 wt %.

15. The resin composition according to claim 1, wherein in the weight molecular weight distribution of the poly(3-hydroxyalkanoate) resin, the proportion of the poly(3-hydroxyalkanoate) having a weight molecular weight of $20\times10^4$ or less is from 37 to 52 wt %.

16. The resin composition according to claim 6, comprising from 5 to 40 parts by weight of the inorganic filler per 100 parts by weight of a total resin component comprising the poly(3-hydroxyalkanoate) resin.

17. The resin composition according to claim 6, wherein an average particle size of the inorganic filler is from 0.1 to 100 μm.

18. The resin composition according to claim 6, wherein an average particle size of the inorganic filler is more preferably from 0.1 to 50 μm.

19. The resin composition according to claim 5, comprising from 0.1 to 10 parts by weight of the nucleating agent per 100 parts by weight of the poly(3-hydroxyalkanoate) resin.

20. The resin composition according to claim 5, comprising from 0.5 to 8.5 parts by weight of the nucleating agent per 100 parts by weight of the poly(3-hydroxyalkanoate) resin.

* * * * *